(12) United States Patent
Truesdale et al.

(10) Patent No.: US 9,455,792 B1
(45) Date of Patent: Sep. 27, 2016

(54) SYSTEM AND METHOD FOR MEASURING PASSIVE INTERMODULATION (PIM) IN A DEVICE UNDER TEST (DUT)

(71) Applicant: Anritsu Company, Morgan Hill, CA (US)

(72) Inventors: Derek Truesdale, San Jose, CA (US); Wesley Whiteley, Hollister, CA (US)

(73) Assignee: ANRITSU COMPANY, Morgan Hill, CA (US)

( * ) Notice: Subject to any disclaimer, the term of this patent is extended or adjusted under 35 U.S.C. 154(b) by 0 days.

(21) Appl. No.: 14/601,454

(22) Filed: Jan. 21, 2015

(51) Int. Cl.
| | | |
|---|---|---|
| *H04B 17/00* | (2015.01) | |
| *H04B 17/10* | (2015.01) | |
| *G01R 25/04* | (2006.01) | |
| *H04B 17/11* | (2015.01) | |

(52) U.S. Cl.
CPC .............. *H04B 17/104* (2015.01); *G01R 25/04* (2013.01); *H04B 17/11* (2015.01)

(58) Field of Classification Search
CPC  H04B 17/104; H04B 17/11; H04B 17/0085; G01R 25/04; G01R 23/20
See application file for complete search history.

(56) References Cited

U.S. PATENT DOCUMENTS

| | | | |
|---|---|---|---|
| 2,594,328 | A | 4/1952 | Marchetti |
| 4,274,047 | A | 6/1981 | Hecken |
| 4,991,098 | A | 2/1991 | Dantzler |
| 5,479,090 | A | 12/1995 | Schultz |
| 5,513,094 | A | 4/1996 | Stanley |
| 5,602,709 | A | 2/1997 | Al-Dabbagh |
| 5,706,010 | A | 1/1998 | Franke |
| 5,729,145 | A | 3/1998 | Blades |
| 5,973,568 | A | 10/1999 | Shapiro |
| 5,994,905 | A | 11/1999 | Franchville |
| 6,144,692 | A | 11/2000 | Beck |
| 7,068,096 | B2 | 6/2006 | Chu |
| 7,103,114 | B1 | 9/2006 | Lapierre |
| 7,469,190 | B2 | 12/2008 | Bickel |
| 7,511,472 | B1 | 3/2009 | Xia |
| 7,598,714 | B2 | 10/2009 | Stanley |
| 7,629,764 | B2 | 12/2009 | Shoemaker |
| 7,696,850 | B2 | 4/2010 | Stanford |
| 7,696,940 | B1 | 4/2010 | MacDonald |
| 8,058,880 | B2 | 11/2011 | Bradley |
| 8,294,469 | B2 | 10/2012 | Bradley |

(Continued)

FOREIGN PATENT DOCUMENTS

| | | |
|---|---|---|
| WO | 03030416 | 4/2003 |
| WO | 2004017516 | 2/2004 |
| WO | 2012009757 | 1/2012 |

OTHER PUBLICATIONS

Bell, et al., Range to Fault Technology, 2011, 10 pages, Kaelus.

(Continued)

*Primary Examiner* — Dac Ha
(74) *Attorney, Agent, or Firm* — Tucker Ellis LLP

(57) ABSTRACT

In an embodiment, a method for calculating PIM associated with a DUT comprises obtaining a first measurement of PIM with the DUT connected to the measuring instrument, introducing a shift in a phase offset of PIM produced at the DUT in response to test signals generated by the measuring instrument, obtaining, upon introducing the shift, a second measurement of PIM with the DUT connected to the measuring instrument and calculating the PIM associated with the DUT based on the first measurement and the second measurement.

18 Claims, 6 Drawing Sheets

(56) References Cited

U.S. PATENT DOCUMENTS

| | | |
|---|---|---|
| 8,498,582 B1 | 7/2013 | Bradley |
| 8,666,322 B1 * | 3/2014 | Bradley .................. H04B 17/11 324/612 |
| 8,816,672 B1 | 8/2014 | Bradley |
| 8,903,324 B1 | 12/2014 | Bradley |
| 2002/0030871 A1 | 3/2002 | Anderson |
| 2002/0094785 A1 | 7/2002 | Deats |
| 2003/0232600 A1 | 12/2003 | Montgomery |
| 2005/0141602 A1 | 6/2005 | Hyun |
| 2006/0202900 A1 | 9/2006 | Simile |
| 2006/0290358 A1 * | 12/2006 | Motta ..................... G01R 23/20 324/634 |
| 2009/0096466 A1 | 4/2009 | Delforce |
| 2009/0124122 A1 | 5/2009 | Stanford |
| 2009/0125253 A1 | 5/2009 | Blair |
| 2010/0029553 A1 | 2/2010 | Scheibel |
| 2010/0052652 A1 | 3/2010 | Mitchell |
| 2010/0085061 A1 | 4/2010 | Bradley |
| 2010/0164504 A1 | 7/2010 | Bradley |
| 2010/0194382 A1 | 8/2010 | Montena |
| 2010/0295533 A1 * | 11/2010 | Kuga ..................... G01R 23/20 324/76.39 |
| 2012/0086612 A1 | 4/2012 | Linehan |
| 2013/0071112 A1 | 3/2013 | Melester |
| 2013/0182753 A1 * | 7/2013 | Delforce ............ H04B 17/0085 375/228 |
| 2014/0146866 A1 | 5/2014 | Strachan |

OTHER PUBLICATIONS

Lui, Passive Intermodulation Interference in Communication Systems, Jun. 1990, pp. 109-118, vol. 2, Issue 3, Electronics & Communication Engineering Journal.

Eron, PIM Requirements for Low Power Wireless Components and Subsystems, White Paper, 4 pages, Microlab.

Hartman, et al., PIM Test Power Levels for Mobile Communications Systems, 2012, 8 pages, Kaelus.

Holzman, Essentials of RP and microwave grounding, Chapter 4: Transmission Line Transitions, 2006, 31 pages, Artech House, Inc.

\* cited by examiner

SYSTEM AND METHOD FOR MEASURING PASSIVE INTERMODULATION (PIM) IN A DEVICE UNDER TEST (DUT)

BACKGROUND

1. Technical Field

The present invention relates generally to systems and methods for measuring passive intermodulation (PIM) and to systems and methods for identifying PIM generated by components of such systems.

2. Related Art

Passive intermodulation (PIM), resulting from the non-linear mixing of two or more frequencies in a passive device such as a connector or cable, can be problematic for operators of wireless communication systems. PIM can appear, for example, as existing equipment ages, when new carriers are co-located, when new carriers are overlaid (diplexed) into old antenna runs, and when new equipment is installed. In a cellular network, PIM creates interference that can reduce a receive sensitivity of a cell or block calls. This interference can affect the cell that creates it, as well as other nearby receivers. PIM can be a serious issue for operators of wireless communication systems wanting to maximize a system's reliability, data rate, capacity, and return on investment.

High-speed digital data communications have further increased the problematic nature of PIM. PIM has surfaced as a problem for wireless data transmission using modern standards including Long-Term Evolution (LTE), Global System for Mobile Communications (GSM), Advanced Wireless Service (AWS) and Personal Communication Service (PCS) standards. As cell usage and throughput grow, the peak power produced by new digital modulations increases dramatically, potentially contributing heavily to PIM problems. On-site experiments have shown significant decreases in download speeds linked to slight increases in PIM. For example, drive tests have revealed an approximate 18% drop in download speed when residual PIM level is increased from −125 dBm to −105 dBm.

PIM can be reduced or eliminated by replacing or correcting sources of PIM, including faulty cables or connectors. Test systems can be utilized to detect PIM in a communication system and enable a technician to locate the source of the detected PIM. A test system to measure PIM will typically create signals at two (or more) different frequencies, amplify them and provide them, for example, through cables connecting base stations to antennas for transmitting and receiving signals. A return signal carrying PIM is filtered to select a desired test frequency harmonic where PIM is detectable, and measurements of the magnitude of a PIM and the distance-to-PIM are provided to the technician of the test system.

SUMMARY OF THE INVENTION

Embodiments of the present invention are related to devices and methods of calculating passive intermodulation (PIM) associated with a device under test (DUT) using a measuring instrument configured to generate test signals. In accordance with an embodiment, a method for calculating PIM associated with a DUT comprises obtaining a first measurement of PIM with the DUT connected to the measuring instrument, introducing a shift in a phase offset of PIM produced at the DUT in response to test signals generated by the measuring instrument, obtaining, upon introducing the shift, a second measurement of PIM with the DUT connected to the measuring instrument and calculating the PIM associated with the DUT based on the first measurement and the second measurement.

In an embodiment, obtaining the first measurement and the second measurement includes generating a first tone having a fixed frequency, generating a second tone having a variable frequency, sweeping the variable frequency of the second tone within a frequency band, and measuring intermodulation generated in response to the first tone and the second tone and received at the measuring instrument. In an embodiment, calculating the PIM associated with the DUT includes subtracting the first measurement and the second measurement.

In an embodiment, a shift in the phase offset is introduced by increasing a transmission path between a signal source of the measuring instrument and the DUT. The transmission path can be increased, for example, via an additional transmission line connected between the measuring instrument and the DUT. Alternatively, the transmission path can be increased via an alternative signal path from the signal source of the measuring instrument to an output of the measuring instrument.

In an embodiment, the transmission path is increased by a length that is at least one quarter of a wavelength of a PIM having a frequency lowest within a band of frequencies of PIM generated at the DUT. In an alternative embodiment, the transmission path is increased by a length that is at least three eighths of a wavelength of a PIM having a frequency lowest within a band of frequencies of PIM generated at the DUT.

In an embodiment, the shift in the phase offset of PIM generated at the DUT in response to test signals generated by the measuring instrument is approximately 180°, while in an alternative embodiment, the shift in the phase offset of PIM generated at the DUT in response to test signals generated by the measuring instrument is approximately 270° or more. In an embodiment, first and second measurements are obtained a plurality of times and the calculation of PIM associated with the DUT is an estimation based on peaks and minimums in the plurality of measurements.

In an embodiment, the method further comprises calibrating the measuring instrument based on the obtained first measurement. Upon calibrating the measuring instrument, the second measurement is a net measurement and the PIM associated with the DUT is calculated based on the net measurement.

In an embodiment, the method further comprises determining whether the calculated PIM exceeds a threshold and communicating, to a user via the measuring instrument, whether the calculated PIM exceeds the threshold.

In alternative embodiments, obtaining the first measurement and the second measurement includes generating a first tone having a fixed frequency, generating a second tone having a fixed frequency, and varying a length of a transmission path between a signal source of the measuring instrument and the DUT. Intermodulation generated in response to the first tone and the second tone and received at the measuring instrument is measured and the PIM associated with the DUT is calculated by subtracting the first measurement and the second measurement.

In an embodiment, a measuring instrument for calculating PIM associated with a DUT comprises a signal generator for generating test signals, a test port, and a transmission path extending from the signal generator and the test port. The measuring instrument further comprises a computer readable storage medium and processor operating thereon, wherein the computer readable storage medium includes instructions that when executed in response to user input cause the measuring instrument to perform methods in accordance with embodiments described herein.

BRIEF DESCRIPTION OF THE DRAWINGS

Further details of the present invention are explained with the help of the attached drawings in which.

DETAILED DESCRIPTION

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. Like parts or elements may be described in a single embodiment, or they may be described in multiple embodiments. Further, the first digit in a reference designator including three digits refers to the embodiment in which the part or element is described.

Figure 1:
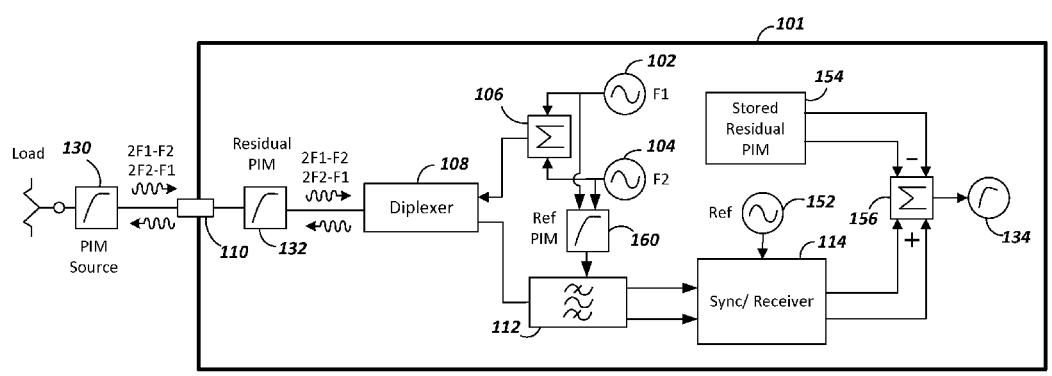
FIG. 1 is a block diagram of components of an instrument for measuring PIM.

FIG. 1 is a simplified, block diagram of an instrument 101 usable for measuring PIM (referred to hereinafter as a measuring instrument). The measuring instrument 101 comprises two signal sources, with a first signal source 102 generating a first tone at frequency F1 and a second signal source 104 generating a second tone at frequency F2. The test signals generated by the signal sources are provided to a combiner 106 to create a combined signal with frequencies F1 and F2 at the combiner output. A diplexer 108 passes the combined signal to a test port 110 connected with a device, system and/or network (referred to hereinafter as a device-under-test (DUT)). Unwanted signals related to PIM sources can be produced when multiple signals are allowed to share the same signal path in a nonlinear transmission medium. Where the DUT includes a PIM source 130, a reflected signal (also referred to as a reverse signal) is produced and returned to the measuring instrument. The unwanted signals can include components at multiple different frequencies predictable using a pair of formulas including the expressions nF1-mF2 and nF2-mF1, where F1 and F2 are the carrier frequencies and the constants n and m are positive integers. Generally the components of concern are the third, fifth and seventh order components. The third order response can be particularly problematic, resulting in the highest power components at frequencies 2F1-F2 as well as 2F2-F1.

A reflected signal received by the measuring instrument is mixed, down converted and filtered (with components combined in block 112 for simplification) to obtain an intermediate frequency (IF) signal. The IF signal is amplified, the magnitude of the IF signal is detected by a receiver 114 and a measurement of PIM is obtained. Components of the measuring instrument can contribute delay to measurements, preventing a usable determination of the distance to the PIM source from the measuring instrument. For example, the filters of the measuring instrument can contribute a group delay that has associated with it an uncontrollable length substantial enough to corrupt a measurement of PIM. However, a reference PIM source (not shown, also referred to herein as a calibration standard) can be used with the measuring instrument to enable the measuring instrument to locate a PIM source relative to the measuring instrument, for example as described in U.S. Pat. No. 8,666,322 to Bradley et al., entitled "System and Method for Measuring and Locating Passive Intermodulation (PIM) Sources in a Network and/or Device."

The block diagram of FIG. 1 includes a contribution to PIM introduced by components of the measuring instrument itself (also referred to herein as residual PIM 132). There are multiple internal components in a measuring instrument that can degrade over time, generating PIM in a degraded state, including components such as the test port and the diplexing filter. Further, other sources of PIM such as internal crosstalk between output power amplifier sources can contribute to residual PIM. The presence of residual PIM can corrupt measurement of PIM produced at or by a DUT. Once this residual PIM reaches a limit approaching the magnitude of a PIM generated by the DUT, for example, the system becomes unusable and must be repaired. PIM measurements made by a measuring instrument can account for and/or remove residual PIM attributable to the measuring instrument itself using additional components, for example as described in U.S. Pat. No. 8,816,672 to Bradley, entitled "Systems and Methods for Accounting for Residual Passive Intermodulation in Passive Intermodulation Measuring Instruments," and shown partially in FIG. 1.

The receiver of the measuring instrument can include a phase coherent detector capable of referring real and imaginary in-phase and quadrature outputs to a reference signal 152 to obtain an accurate measurement of residual PIM when the PIM measuring instrument is connected with a known good load as the DUT. The receiver is selectively connectable with a measurement channel to receive reflected signals from a PIM source and a reference channel including the test signal sources connected through a reference PIM 160. The reference PIM can be generated using any known technique for producing a signal that is generally stable in amplitude and phase after calibration. The reference signal frequency is derivable from the two test signal source frequencies as the receiver switches back and forth between the measurement channel and the reference channel to develop a phase and magnitude representation of the two test signals with no regard to the phase relationship of the two test signals and local oscillator (LO) signals used to down convert the received signal.

Memory 154 is usable for storing a residual PIM measurement. The stored information includes real and imaginary data. A combiner 156 includes a first input connected with the phase detector of the receiver and a second input connected with the memory. The combiner is usable to perform, for example, complex linear subtraction to eliminate the residual PIM from further measurements made with the PIM measuring instrument. When the PIM measuring instrument is connected in-line with a PIM source, the receiver will display or otherwise output a measurement that is indicative of the PIM associated with the DUT, and not the measuring instrument.

Figure 2:
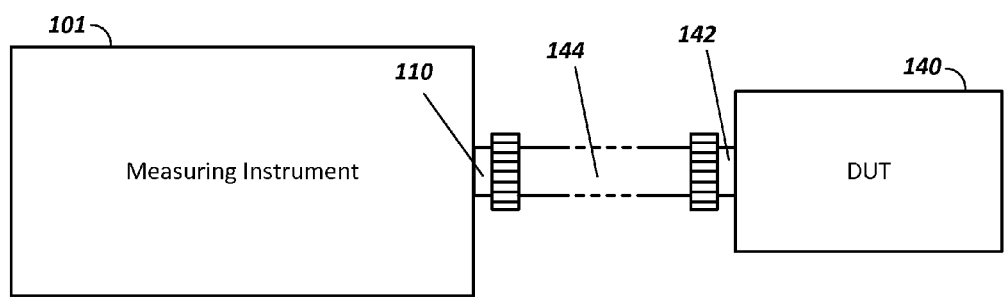
FIG. 2 illustrates a test system for calibrating the instrument of FIG. 1 and frequency components of PIM that can be produced by the instrument and by a DUT of the test system.
Figure 2:
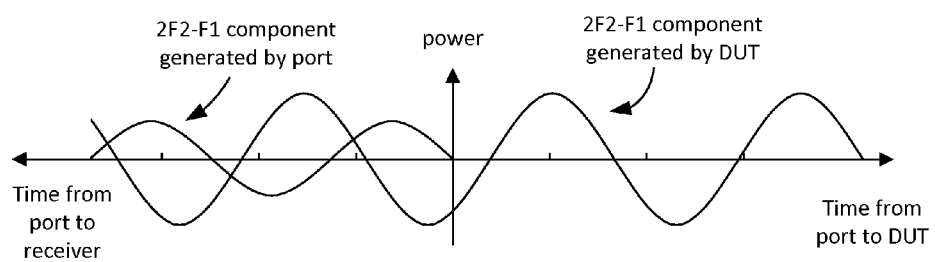

Referring to FIG. 2, residual PIM produced by the measuring instrument can be measured by connecting the measuring instrument to an appropriate DUT 140, such as a known good load. A known good load can comprise, for example, a termination that will attenuate and dissipate a signal transmitted by the measuring instrument while producing little or no PIM relative to a noise floor of the measuring instrument. Such a load is also referred to herein as a low-PIM termination. As shown, the DUT can be connected to the test port of the measuring instrument by a cable 144 or other transmission medium extending between the test port and a connector 142 of the DUT. The measuring instrument can be calibrated by generating a test signal and obtaining a measurement of PIM. If the DUT is a low PIM termination that generates no PIM or PIM below a noise floor of the measuring instrument (e.g., less than −120 dBm), the total measurement of PIM can be stored as the measurement of residual PIM and the measuring instrument can then be used as described above to obtain measurements for a target DUT to identify and locate sources of PIM in the target DUT.

It has been observed by the present inventors that a DUT used in measuring residual PIM, such as a low PIM termination, can suffer wear over time and with usage and the PIM performance of the DUT can degrade, resulting in a PIM contribution that has drifted such that the PIM performance is no longer known, or resulting in a PIM contribution that has unacceptably increased where it had been assumed to be negligible with respect to the noise floor of the measuring instrument. If a measuring instrument is calibrated by measuring PIM using the degraded DUT and the measurement is stored in memory as a representation of residual PIM, as described above and shown in FIG. 2, the PIM attributable to the degraded DUT can be unwittingly included with the residual PIM of the measuring instrument. The inclusion of PIM attributable to the degraded DUT in a calibration of the measuring instrument to account for residual PIM can be problematic when the measuring instrument is then connected with a second DUT. PIM produced by a PIM source in the second DUT can be masked by the calibration, potentially masking a source of unacceptably high interference that is degrading system performance.

FIG. 2 further illustrates examples of select frequency components of possible PIM that may be produced both by a test port and by a PIM source associated with a DUT reflected back to a receiver of the measuring instrument on a Cartesian coordinate system. The y-axis represents the power of the PIM signal, while the x-axis represents a time away from the test port. It is noted that the illustrated signal components represent a snapshot of PIM generated in response to a test signal having components at frequencies F1, F2. In practice, one (or both) of the frequencies F1, F2 may be swept, and thus PIM produced by PIM sources will likewise be swept, varying with time. The components are shown isolated from other components of PIM produced within the test system and comprise third order components generated at frequency 2F2-F1. Residual PIM produced by the test port, represented as the origin of the Cartesian coordinate system, is shown reflected back into the measuring instrument. PIM produced by the DUT is shown reflected from some distance away from the test port and back into the measuring instrument via the test port.

A method for calculating PIM associated with a DUT in accordance with an embodiment can comprise introducing a phase shift to a reflected signal produced at or by a DUT relative to an initial phase offset of a test signal generated by the measuring instrument to separate the portion of a PIM measurement which is contributed by the DUT from the portion of the PIM measurement which is residual PIM contributed by the measuring instrument. In an embodiment, the phase shift can be introduced by adjusting an initial phase offset of the PIM generated at or by the DUT in response to the test signal. The adjustment for introducing the phase shift can be accomplished by extending a transmission path from the test port to the DUT.

Figure 3:
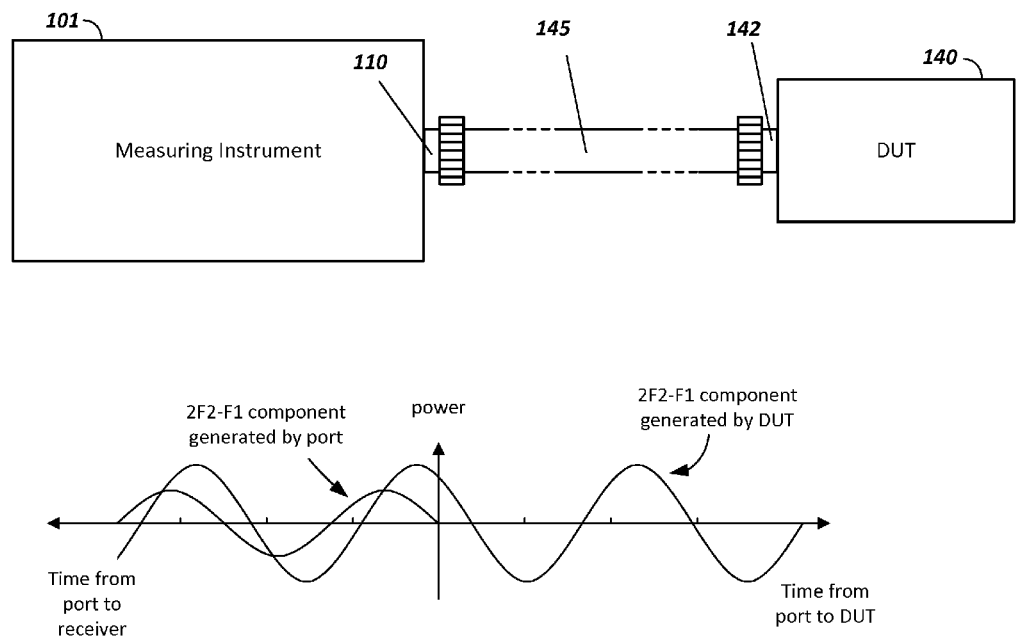
FIG. 3 illustrates the test system of FIG. 2 with the introduction of a phase shift in a frequency component of PIM produced by the DUT of the test system in accordance with an embodiment.

As shown in FIG. 3, the transmission path can be extended, for example, through the use of a longer cable 145 connected between the test port and the connector of the DUT. As noted above, the transmission path need not necessarily comprise a cable, for example the transmission path could be a waveguide. The extended transmission path, in this embodiment the additional length introduced by the longer cable, can be determined based on a frequency of the PIM components of interest, and the operating range of the measuring instrument. In an embodiment, the cable length can be selected based on the frequency of any third order components of PIM that may be generated based on the expression 2F2-F1, for example. In an embodiment, a single extended cable can be used having a minimum additional length over the initial cable that will ensure a detectable phase shift at or near a lowest frequency of a range of targeted frequencies. Further, the minimum additional length should capture at least one half of a wavelength to capture a crest and trough as PIM is produced in response to a swept test signal, and preferably lengthy enough to capture sufficiently more than one half of a wavelength to generally insure that at least one crest and one trough is captured. However, because the measurement is a reflected measurement, the phase shift is twice the actual phase length of the cable. Thus, for example, a test signal which when swept through a series of frequencies generates PIM at 75 MHz would require a cable having a minimum additional length of about 4 meters (one quarter of a wavelength at 75 MHz), and preferably an additional length greater than 4 meters, for example 6 meters (about three eights of a wavelength at 75 MHz).

FIG. 3 further illustrates select frequency components of possible PIM that may be generated both by the test port and by the PIM source associated with a DUT reflected back to a receiver of the measuring instrument on a Cartesian coordinate system. As above, y-axis represents the power of the PIM signal, while the x-axis represents a time away from the test port. The PIM components are the same components illustrated in FIG. 2, produced in response to the same test signal having the same initial phase offset. As shown, the longer cable has introduced a phase shift in the PIM reflected by or at the DUT, relative to the PIM produced by or at the DUT in FIG. 2, but there is no phase shift in the PIM produced by or at the test port.

Figure 4:
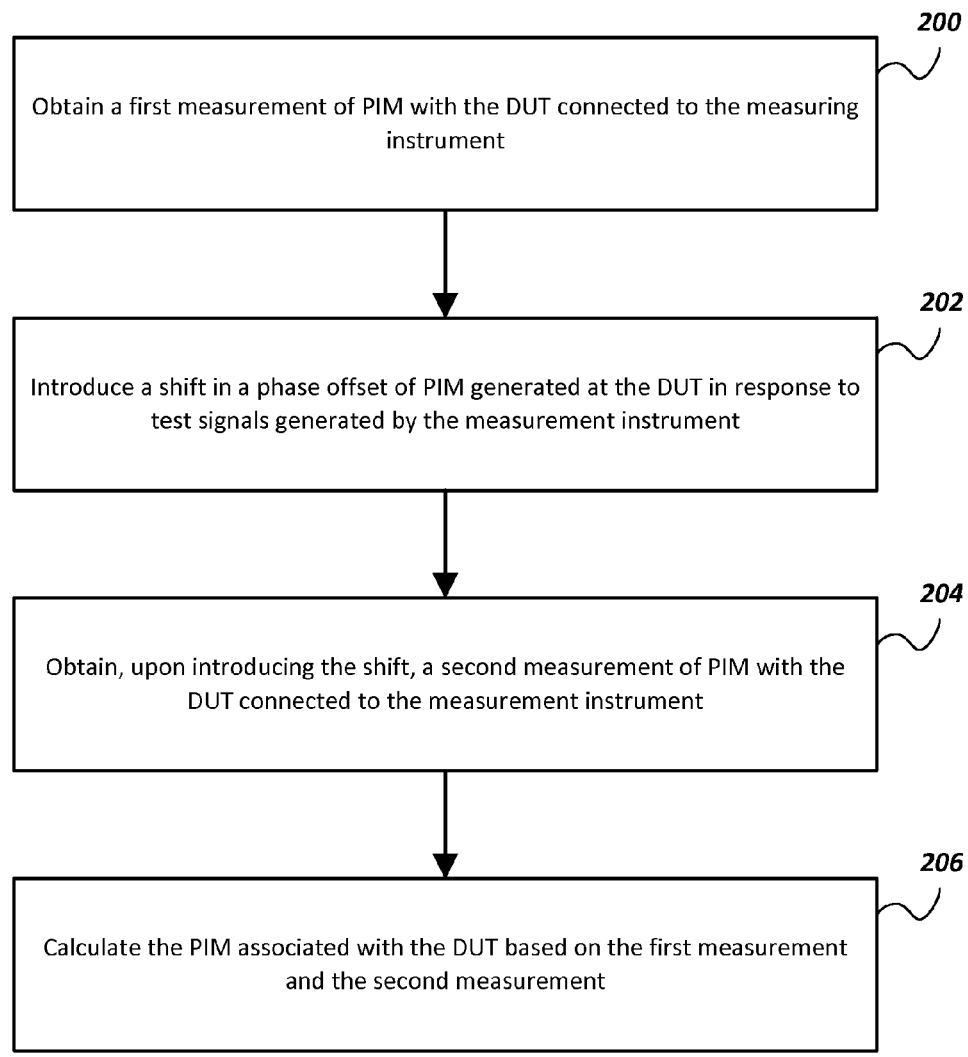
FIG. 4 is a flowchart of a method for calculating the contribution of PIM produced by the DUT of the test system in accordance with an embodiment.

FIG. 4 is a flowchart of a method calculating PIM associated with a DUT using a measuring instrument configured to generate test signals in accordance with an embodiment. A first measurement of PIM is obtained with the DUT connected to the measuring instrument (Step 200). The first measurement comprises contributions to PIM from both the measuring instrument and the DUT produced in response to a test signal having two (or more) combined frequencies, one (or both) of which is swept. A shift in a phase offset of PIM produced at the DUT in response to the test signal is then introduced (Step 202). As described above, the shift in the phase offset of PIM can be achieved by lengthening a transmission path connecting a receiver of the measuring instrument to the DUT. A second measurement of PIM is then obtained with the DUT connected to the measuring instrument and the shift in phase offset introduced (Step 204). The second measurement likewise comprises contributions to PIM from both the measuring instrument and the DUT produced in response to a test signal; however, the component of PIM contributed by the DUT is phase shifted. Finally, the PIM associated with the DUT is calculated based on the first measurement and the second measurement (Step 206).

Figure 5:
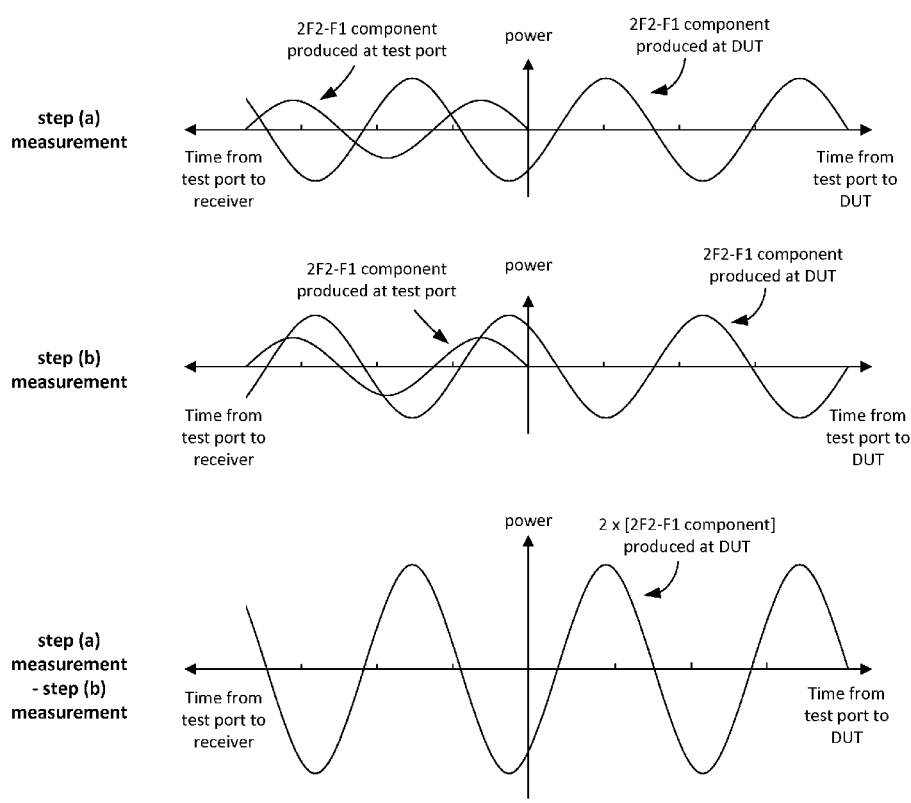
FIG. 5 illustrates the steps for calculating the contributions of PIM produced by the DUT of the test system in accordance with an embodiment.

FIG. 5 illustrates the steps for calculating the PIM associated with the DUT, in accordance with an embodiment. The frequency components illustrated in FIGS. 2 and 3 are shown as examples representing measurements obtained from Step 200 and Step 204. As can be seen, the contribution to PIM from the measuring instrument produced at the test port is the same, while the phase of the contribution to PIM from the DUT has shifted 180°. The measurements are subtracted from one another to eliminate the contribution to PIM from the measuring instrument and doubling (for the phase shift shown) the contribution to PIM from the DUT. As will be appreciated, a phase shift that results in an antiphase frequency component being produced is not likely, including where the additional length introduced is increased to account for a range of frequencies and to ensure the capture of a crest and trough of at least one wave. It can be preferred that a minimum length be targeted such that the shift in the phase offset of PIM generated at the DUT in response to test signals generated by the measuring instrument is approximately 270° or more. In such an embodiment, it can be beneficial to obtain first and second measurements a plurality of times so that the calculation of PIM associated with the DUT is an estimation based on the peaks and minimums in the plurality of measurements.

In another embodiment, a method for verifying that PIM characteristics of a DUT are sufficiently below a noise floor of a measuring instrument or below a predefined threshold can comprise the following. The measuring instrument can first be connected with a known good load acting as the DUT, as described above, and calibrated using the DUT. The calibration can then be verified by a PIM-versus-time measurement of residual PIM with the DUT still connected with the measuring instrument. The PIM-versus-time measurement is performed by generating two tones of fixed frequency and measuring PIM produced in response. The PIM-versus-time measurement tracks the instantaneous PIM level and records the peak PIM level experienced throughout the fixed frequency PIM test. The measurement is useful for dynamic PIM tests because it not only captures the peak PIM value for pass/fail determination but also provides a visual indication of the stability of the system under test. A swept PIM trace can then be performed whereby one (or both) of the frequency components of the test signal is swept to verify the calibration over frequency. The DUT can then be disconnected from the measuring instrument and a phase shift can be introduced, for example via the connection of additional transmission path between the measuring instrument and the DUT. A PIM-versus-time measurement of residual PIM with the DUT reconnected with the measuring instrument is then performed, which will likely not be noticeably higher than the previous PIM-versus-time measurement. A swept PIM trace is then be performed, noting the peak value in the trace and the minimum value from the trace. PIM associated with the DUT can then be calculated using the minimum and peak values and compared with a noise floor of the measuring instrument.

Commonly, PIM measurement results are presented in decibels (dB). PIM measurement results may be presented in dBm, whereby the measurement is referenced to one milliwatt. For PIM measuring instruments that provide measurements in dBm, PIM associated with the DUT can be calculated by converting the measurements to linear values, calculating a result and converting the result back to logarithmic value. In an embodiment, the peak value and the minimum value are converted from dBm values to linear values, the two linear values are averaged, and the average is converted back to a dBm value. The result can then be presented to the technician or other operator. It is noted that the result can be a magnified value of the actual contribution of PIM by the DUT. For example, where the phase shift introduced is 180°, the result can be twice the actual contribution of PIM by the DUT.

In still other embodiments, the measuring instrument can determine vectors of PIM produced at the DUT for the two measurements and calculate PIM using vector mathematics, rather than measuring scalar values. In such embodiments, the minimum additional length that the transmission path must include need not necessarily enable the measurement of a crest and a trough and therefore may be less than one half of a wavelength.

The calculation of the PIM associated with the DUT can be performed by a technician or other operator by recording the first measurement and the second measurement and calculating the difference, for example, using a spreadsheet. However, such a calculation can be cumbersome and confusing. In an embodiment, a measuring instrument can include a computer readable storage medium and processor operating thereon, wherein the computer readable storage medium includes instructions that when executed in response to user input cause the measuring instrument to 1) provide instructions to a technician or other operator to assemble the test system as appropriate for each measurement, 2) perform the measurements once the test system is assembled and the technician or other operator has indicated assembly, and 3) calculate the PIM associated with the DUT once the measurements have been completed. The calculation of PIM associated with the DUT can then be communicated to the technician or other operator. The communication can be in the form of a result, for example provided in decibel units. In alternative embodiments, the result can be communicated in some other fashion. For example, the measuring instrument can be provided with a threshold limit for acceptable PIM levels and can communicate a "pass" or "fail" result based on the threshold limit.

Figure 6:
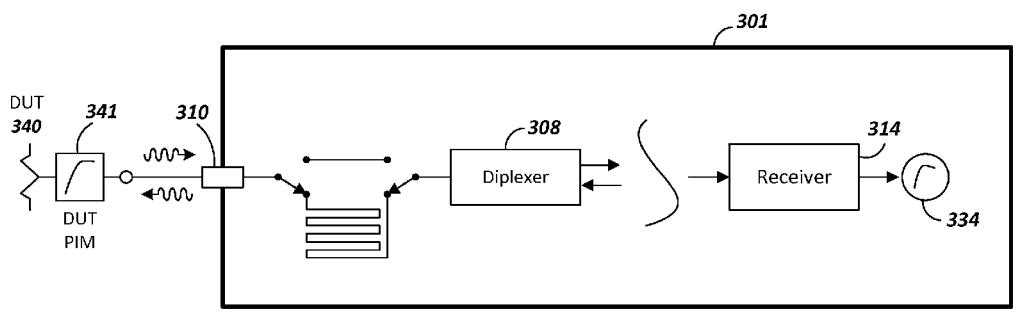
FIG. 6 illustrates a test system for measuring the contribution of PIM produced by the DUT in accordance with another embodiment.

While in the embodiments described above, a phase shift is introduced to a reflected signal produced at or by a DUT relative to an initial phase offset of a test signal generated by the measuring instrument by extending a transmission path between the test port and the DUT, in another embodiment, the phase shift can be introduced to a reflected signal produced at or by the DUT by extending a transmission path internal to the measuring instrument. Referring to FIG. 6, a measuring instrument 301 for calculating PIM associated with a DUT in accordance with an alternative embodiment can include an alternative signal path 352 internal to the measuring instrument 301. The measuring instrument can include the ability to switch between a primary signal path 350 having a first length, and the alternative signal path having a second, longer length to thereby increase a transmission path between the receiver 314 of the measuring instrument and a DUT 340. As shown, the switchable signal paths extend between a diplexer 308 of the measuring instrument and a test port 310 of the measuring instrument.

In alternative embodiments, the first tone and the second tone generated by the first signal source and the second signal source, respectively, can both be fixed rather than at least one of the signal sources being swept. In such an embodiment, the length can be varied as PIM measurements are performed to produce PIM in the DUT (provided the DUT is contributing detectable PIM).

It is noted that embodiments of systems and measuring instruments for performing methods described herein may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the measuring instrument includes a computer program product which is a storage medium or computer readable medium (media) having instructions stored thereon/in which can be used to program a computer to perform any of the processes and methods of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing descriptions of the present invention have been presented for purposes of illustration and description. They are not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed:

1. A method of calculating passive intermodulation (PIM) associated with a device under test (DUT) using a measuring instrument configured to generate test signals, the method comprising:
   obtaining a first measurement of PIM with the DUT connected to the measuring instrument;
   introducing a shift in a phase offset of PIM produced at the DUT in response to test signals generated by the measuring instrument;
   obtaining, upon introducing the shift, a second measurement of PIM with the DUT connected to the measuring instrument; and
   calculating the PIM associated with the DUT based on the first measurement and the second measurement;
   wherein the shift in the phase offset is introduced by increasing a transmission path between a signal source of the measuring instrument and the DUT.

2. The method of claim 1,
   wherein obtaining the first measurement and the second measurement includes
      generating a first tone having a fixed frequency,
      generating a second tone having a variable frequency,
      sweeping the variable frequency of the second tone within a frequency band, and
      measuring intermodulation generated in response to the first tone and the second tone and received at the measuring instrument; and
   wherein calculating the PIM associated with the DUT includes
      subtracting the first measurement and the second measurement.

3. The method of claim 1, wherein the transmission path is increased via an additional transmission line connected between the measuring instrument and the DUT.

4. The method of claim 1, wherein the transmission path is increased via an alternative signal path from the signal source of the measuring instrument to an output of the measuring instrument.

5. The method of claim 1, wherein the transmission path is increased by a length that is at least one quarter of a wavelength of a PIM having a frequency lowest within a band of frequencies of PIM generated at the DUT.

6. The method of claim 5, wherein the transmission path is increased by a length that is at least three eighths of a wavelength of a PIM having a frequency lowest within a band of frequencies of PIM generated at the DUT.

7. The method of claim 1, wherein the shift in the phase offset of PIM generated at the DUT in response to test signals generated by the measuring instrument is approximately 180°.

8. The method of claim 1,
   wherein obtaining a first measurement includes obtaining a peak value and a minimum value in a first trace generated by the measuring instrument; and
   wherein obtaining a second measurement includes obtaining a peak value and a minimum value in a second trace generated by the measuring instrument.

9. The method of claim 8,
   wherein the shift in the phase offset of PIM generated at the DUT in response to test signals generated by the measuring instrument is approximately 270° or more;
   wherein obtaining the first and second measurements is performed a plurality of times; and
   wherein the calculation of PIM associated with the DUT is an estimation based on peak values and minimum values in the plurality of measurements.

10. The method of claim 1, further comprising:
    calibrating the measuring instrument based on the obtained first measurement; and
    wherein upon calibrating the measuring instrument, the second measurement is a net measurement and the PIM associated with the DUT is calculated based on the net measurement.

11. The method of claim 1, further comprising:
    determining whether the calculated PIM exceeds a threshold; and
    communicating, to a user via the measuring instrument, whether the calculated PIM exceeds the threshold.

12. The method of claim 1,
    wherein obtaining the first measurement and the second measurement includes
       generating a first tone having a fixed frequency,
       generating a second tone having a fixed frequency, varying a length of a transmission path between a signal source of the measuring instrument and the DUT, and measuring intermodulation generated in response to the first tone and the second tone and received at the measuring instrument; and wherein calculating the PIM associated with the DUT includes subtracting the first measurement and the second measurement.

13. A measuring instrument for calculating passive intermodulation (PIM) associated with a device under test (DUT), the system comprising:

a signal generator for generating test signals;

a test port;

a transmission path extending between the signal generator and the test port;

a computer readable non-transitory storage medium and processor operating thereon, wherein the computer readable non-transitory storage medium includes instructions that when executed in response to user input cause the measuring instrument to obtain a first measurement of PIM with the DUT connected to the measuring instrument, obtain, upon the introduction of a shift in a phase offset of PIM generated at the DUT in response to test signals generated by the measuring instrument, a second measurement of PIM with the DUT connected to the measuring instrument, and calculate PIM in the DUT based on the first measurement and the second measurement.

14. The measuring instrument of claim 13, wherein the computer readable, non-transitory storage medium further includes instructions that when executed in response to user input cause the measuring instrument to obtain the first measurement and the second measurement by causing the measuring instrument to generate a first tone having a fixed frequency, generate a second tone having a variable frequency, sweep the variable frequency of the second tone within a frequency band, and measure intermodulation generated in response to the first tone and the second tone and received at the measuring instrument.

15. The measuring instrument of claim 13, wherein the computer readable, non-transitory storage medium further includes instructions that when executed in response to user input cause the measuring instrument to obtain the first measurement by obtaining a peak value and a minimum value in a first trace generated by the measuring instrument, and obtain a second measurement by obtaining a peak value and a minimum value in a second trace generated by the measuring instrument.

16. The measuring instrument of claim 13, wherein the computer readable, non-transitory storage medium further includes instructions that when executed in response to user input cause the measuring instrument to calibrate the measuring instrument based on the obtained first measurement; and wherein upon calibrating the measuring instrument, the second measurement is a net measurement and the PIM associated with the DUT is calculated based on the net measurement.

17. The measuring instrument of claim 13, wherein the computer readable, non-transitory storage medium further includes instructions that when executed in response to user input cause the measuring instrument to determine whether the calculated PIM exceeds a threshold, and communicate, to a user via the measuring instrument, whether the calculated PIM exceeds the threshold.

18. A computer readable, non-transitory storage medium including instructions that when executed in response to user input cause a measuring instrument comprising a signal generator for generating test signals, a test port, and a transmission path extending between the signal generator and the test port to perform the operations comprising:

obtaining a first measurement of passive intermodulation (PIM) with the DUT connected to the measuring instrument;

introducing a shift in a phase offset of PIM generated at the DUT in response to test signals generated by the measuring instrument by increasing a transmission path between a signal source of the measuring instrument and the DUT;

obtaining, upon the introduction of the shift in the phase offset of the PIM generated at the DUT in response to test signals generated by the measuring instrument, a second measurement of PIM with the DUT connected to the measuring instrument; and calculating PIM attributable to the DUT based on the first measurement and the second measurement.

* * * * *